(12) United States Patent
Amin et al.

(10) Patent No.: US 7,440,213 B2
(45) Date of Patent: Oct. 21, 2008

(54) APPARATUS AND METHOD FOR CONTROLLING REMNANT MAGNETIZATION IN A MAGNETIC RECORDING HEAD

(75) Inventors: Nurul Amin, Woodbury, MN (US); Song S. Xue, Edina, MN (US); Patrick J. Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 302 days.

(21) Appl. No.: 11/054,456

(22) Filed: Feb. 9, 2005

(65) Prior Publication Data

US 2006/0176601 A1    Aug. 10, 2006

(51) Int. Cl.
G11B 27/36    (2006.01)
G11B 5/03    (2006.01)
G11B 5/17    (2006.01)

(52) U.S. Cl. .............. 360/66; 360/31; 360/123.01
(58) Field of Classification Search ............. None
See application file for complete search history.

(56) References Cited

U.S. PATENT DOCUMENTS

| 4,656,546 A | 4/1987 | Mallory |
| 5,164,869 A * | 11/1992 | Fontana et al. ............ 360/318 |
| 5,696,641 A | 12/1997 | Bailey |
| 6,301,084 B1 * | 10/2001 | Santini ...................... 360/317 |
| 6,330,128 B1 * | 12/2001 | Chang et al. ............... 360/126 |
| 6,441,994 B1 | 8/2002 | Wang et al. |
| 6,646,827 B1 | 11/2003 | Khizroev et al. |
| 6,754,049 B1 * | 6/2004 | Seagle et al. ............... 360/317 |
| 7,075,756 B1 * | 7/2006 | Mallary et al. ............. 360/317 |
| 2004/0252396 A1 * | 12/2004 | Pleiss ........................ 360/55 |
| 2006/0187580 A1 * | 8/2006 | Samofalov et al. ......... 360/125 |

* cited by examiner

*Primary Examiner*—Joseph Feild
*Assistant Examiner*—Daniell L Negrón
(74) *Attorney, Agent, or Firm*—Kinney & Lange, P.A.

(57) ABSTRACT

The present invention provides a magnetic writer. The magnetic writer comprises a write circuit, a write pole, a first write coil for inducing a first magnetic field in the write pole by a first current provided by the write circuit, and a second write coil for inducing a second magnetic field in the write pole by a second current provided by the write circuit. The write circuit provides a first current through the first coil and a second current through the second coil. The write circuit controls the direction of the first current and the second current so that, during writing, the first magnetic field and the second magnetic field have components perpendicular to the air bearing surface that are in the same direction. When not writing, the first magnetic field and second magnetic field have components perpendicular to the air bearing surface in opposite directions.

19 Claims, 10 Drawing Sheets

APPARATUS AND METHOD FOR CONTROLLING REMNANT MAGNETIZATION IN A MAGNETIC RECORDING HEAD

BACKGROUND OF THE INVENTION

The present invention relates generally to the field of magnetic recording heads. In particular, the present invention relates to a magnetic recording head having controlled remnant magnetization.

In an electronic data storage and retrieval system, a transducing head typically includes a writer for storing magnetically-encoded information on a magnetic disc and a reader for retrieving that magnetically-encoded information from the magnetic disc. The reader typically includes two shields and a magnetoresistive (MR) sensor positioned between the shields. Magnetic field from the surface of the disc causes oscillation of the magnetization vector of a sensing layer of the MR sensor, which in turn causes a change in electrical resistivity of the MR sensor. This change in resistivity of the MR sensor can be detected by passing a current through the MR sensor and measuring a voltage across the MR sensor. External circuitry then converts the voltage information into an appropriate format and manipulates that information as necessary.

When the magnetic disc stores data based on magnetization directions generally perpendicular to the plane of the disc, the writer typically includes a write pole and a return pole, but can operate with no return pole. The poles are separated from each other at an air bearing surface of the writer by a gap layer and are connected to each other at a region distal from the air bearing surface by a back gap closer or back via. An alternative writer design uses two return poles, one positioned on each side of the write pole. The air bearing surface is the surface of the recording head that faces the magnetic medium or disc. One or more layers of conductive coils are positioned between the write and return poles, and are encapsulated by insulating layers. The writer and the reader may be arranged in a merged configuration in which a shared pole serves as both the top shield of the reader and the return pole of the writer.

To write data to the perpendicular recording magnetic medium, an electric current is caused to flow through the conductive coils to induce a magnetic field across the write gap between the write pole and the return pole. By reversing the direction of the current through the coils, the polarity of the data written to the magnetic media is reversed. Because the write pole is generally the trailing pole of the write and return poles, the write pole is used to physically write the data to the magnetic medium. Accordingly, it is the write pole that defines the track width of the written data. More specifically, the track width is defined by the width of the write pole at the air bearing surface.

It is desirable that the write pole and the return pole are fabricated such that their magnetization directions are parallel to the ABS when no writing is taking place. Thus, there should be no net magnetic field in the direction perpendicular to the ABS after the write process is completed. However, this is not always the case. Any non-uniformity or defects in the film structure can result in net magnetization in a direction perpendicular to the ABS or non-uniform magnetization. Other causes of non-uniform magnetization include improper film shape, stresses, film structure non-uniformities, or inherited extrinsic hysteresis properties.

Moreover, stray magnetic fields also exist in the disc drive environment. Although the write head may be idle, the presence of stray magnetic fields created by external sources can cause net magnetization of the write pole in a direction perpendicular to the ABS.

The net magnetization at the write pole in a direction perpendicular to the ABS when no writing is taking place can result in unintended destruction of data that has already been written. This is particularly problematic when a double-layer perpendicular recording medium has a highly permeable NiFe soft magnetic underlayer, which magnifies these fringing fields.

Thus, there is a need in the art for a write head that prevents unwanted writing by the write pole when the write pole is supposed to be idle.

BRIEF SUMMARY OF THE INVENTION

The present invention provides a magnetic writer. The magnetic writer comprises a write circuit, a write pole, a first write coil for inducing a first magnetic field in the write pole by a first current provided by the write circuit, and a second write coil for inducing a second magnetic field in the write pole by a second current provided by the write circuit. The write circuit provides a first current through the first coil and a second current through the second coil. The write circuit controls the direction of the first current and the second current so that, during writing, the first magnetic field and the second magnetic field have components perpendicular to the air bearing surface that are in the same direction. When not writing, the first magnetic field and second magnetic field have components perpendicular to the air bearing surface in opposite directions.

The present invention further provides a magnetic writer for writing magnetic information that includes a write pole, a first coil for inducing a first magnetic field in the write pole and a second coil for inducing a second magnetic field in the write pole, a first stabilizer for inducing a third magnetic field in the write pole and a second stabilizer for inducing a fourth magnetic field in the write pole.

The present invention further provides a method of reducing remnant magnetization emanating from a magnetic writer during a non-writing period. The method comprises passing a first current provided by a write circuit through a first write coil to induce a first magnetic field in a write pole and passing a second current provided by the write circuit through a second write coil to induce a second magnetic field in the write pole. The second magnetic field has components perpendicular to an air bearing surface in a direction opposite the first magnetic field. Remnant magnetization directed at the air bearing surface of the write pole is measured and the first current and the second current are adjusted to reduce the remnant magnetization directed at the air bearing surface during a non-writing period.

The present invention further provides a method of operating a writer having a write pole, a write circuit, a first coil, and a second coil. The method comprises writing data on a medium by passing a first current provided by the write circuit through the first coil to induce a first magnetic field in the write pole and passing a second current provided by the write circuit through the second coil in the opposite direction as the first current to induce a second magnetic field in the write pole, resulting in the first and second magnetic fields having components perpendicular to an air bearing surface that are in the same direction. Unwanted writing or erasure of data on the medium is prevented by passing the first current provided by the write circuit through the first coil to induce the first magnetic field in the write pole and passing the second current provided by the write circuit through the second coil in the same direction as the first current to induce the second magnetic field in the write pole, resulting in the first and second magnetic fields having components perpendicular to the air bearing surface in opposite directions.

DETAILED DESCRIPTION

Figure 1:
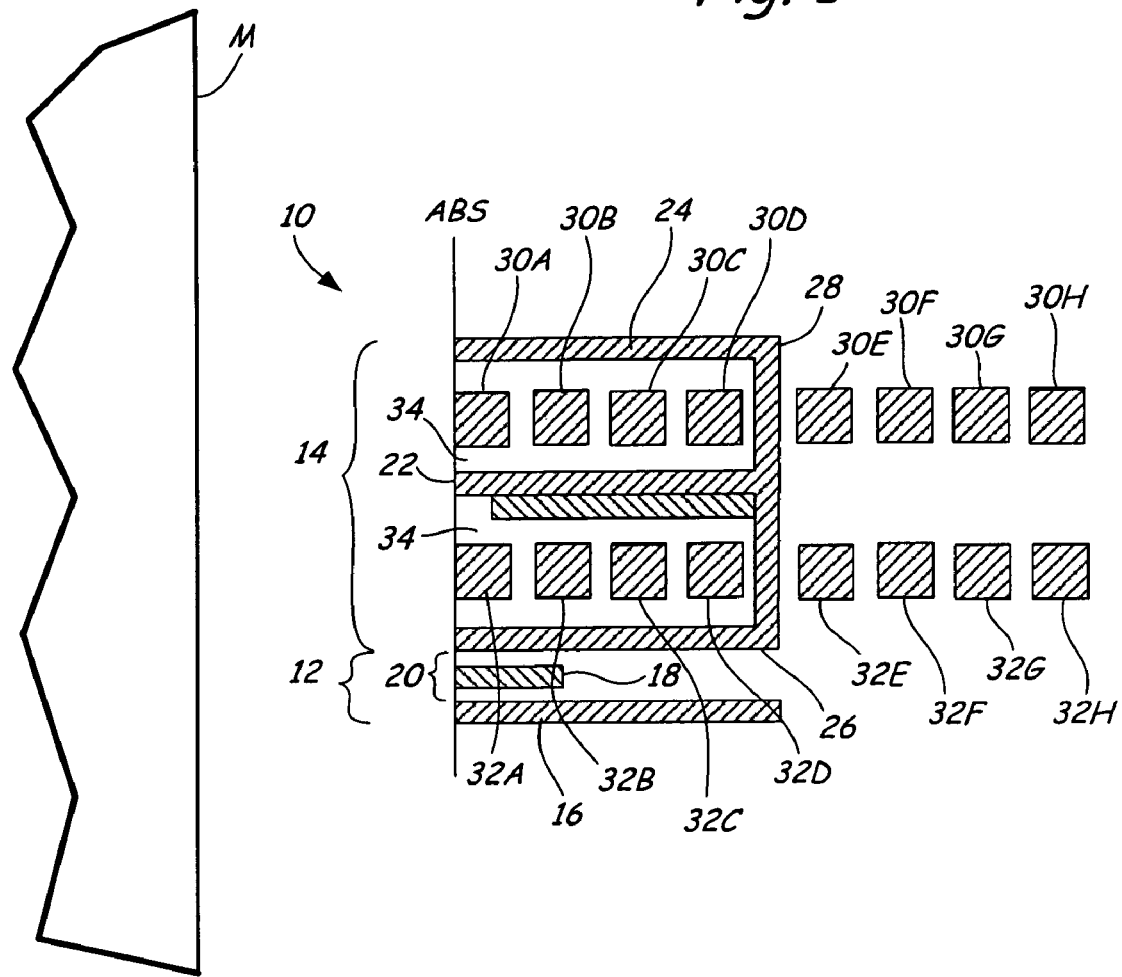
FIG. 1 is a side view of a magnetic recording head according to a first embodiment of the present invention.

FIG. 1 is a side view of a magnetic recording head 10 having a reader 12 and a writer 14. Reader 12 includes bottom shield 16, read element 18, and read gap 20. Read element 18 is positioned between writer 14 and bottom shield 16 adjacent the air-bearing surface (ABS) of magnetic recording head 10. Read gap 20 serves to separate read element 18 from both writer 14 and bottom shield 16.

Writer 14 comprises write pole 22, first return pole 24 and second return pole 26, which are connected to each other distal from the ABS by back via 28, first magnetizing coil layer 30 (shown in cross-section as inner coil windings 30A-30D and outer coil windings 30E-30H), and second magnetizing coil layer 32 (shown in cross-section as inner coil windings 32A-32D and outer coil windings 32E-32H). Although magnetic recording head 10 is shown having two return poles, writer 14 may have one or no return poles without departing from the intended scope of the invention, as will be apparent to those skilled in the art.

First magnetizing (or write) coil 30 is positioned between write pole 22 and first return pole 24. Second magnetizing (or write) coil 32 is positioned between write pole 22 and second return pole 26. First magnetizing coil 30 and second magnetizing coil 32 are electrically isolated from write pole 22 and return poles 24 and 26 by insulating material 34.

First magnetizing coil 30 wraps around back via 28 in a plane substantially normal to both the ABS of magnetic recording head 10 and the plane of the paper in FIG. 1. In one configuration of first coil 30, the coil may be wrapped in the following order: 30D to 30B to 30C to 30F to 30E to 30G to 30A to 30H. Similarly, second magnetizing coil 32 wraps around back via 28 in a plane substantially normal to both the ABS of magnetic recording head 10 and the plane of the paper in FIG. 1. In one configuration of second coil 32, the coil may be wrapped in the following order: 32D to 32E to 32C to 32F to 32B to 32G to 32A to 32H. Each of individual coil sections 30A-30H and 32A-32H are separated from one another and from write pole 22 by an insulating material.

Figure 2:
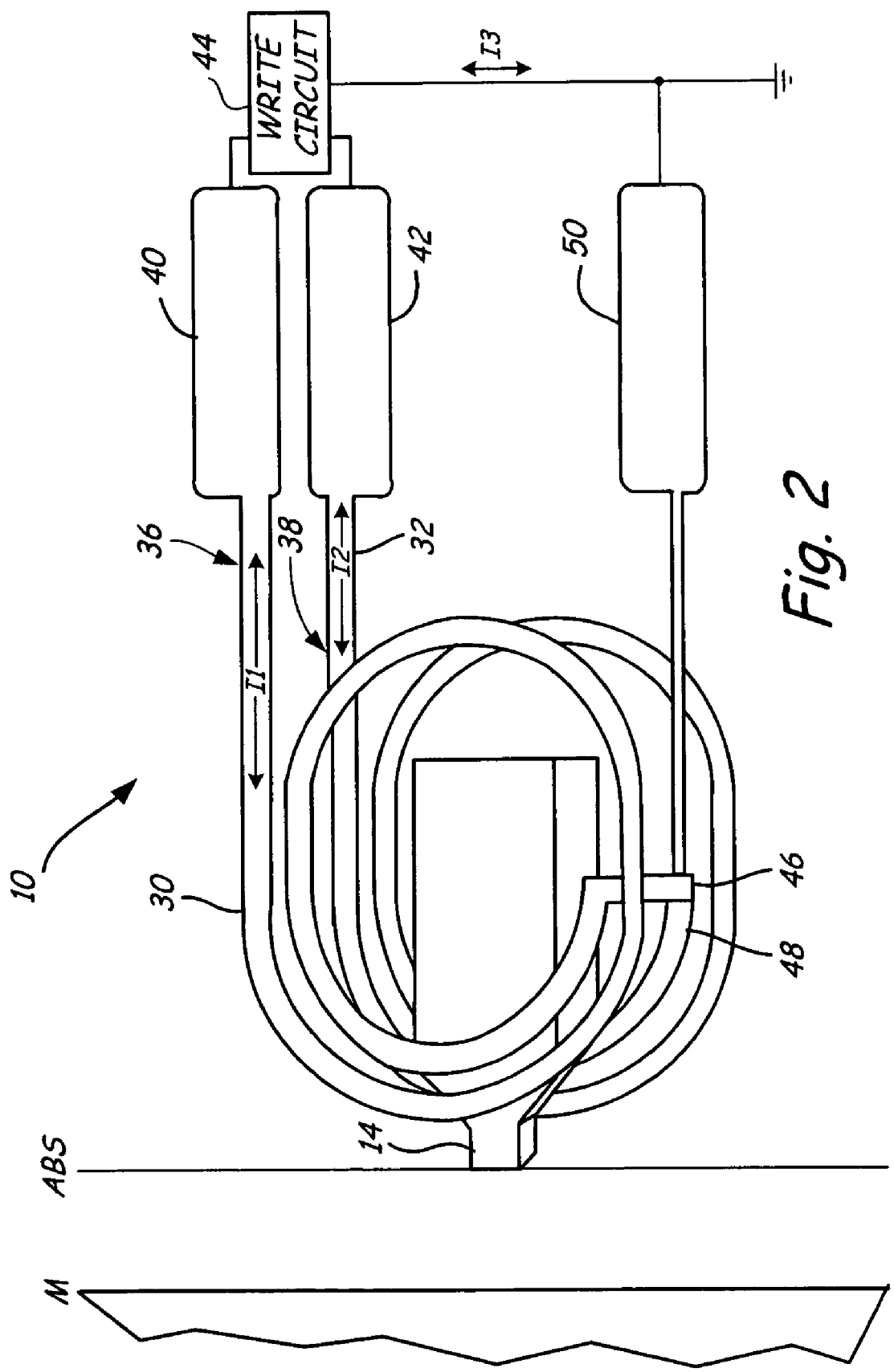
FIG. 2 is a top perspective view showing write coils and a write pole of the magnetic recording head according to the first embodiment of the present invention.

To write data to a magnetic medium, electric currents I1 and I2, illustrated in FIG. 2, are caused to flow through write coils 30 and 32, respectively. Coils 30 and 32 surround back via 28 and pass through insulating material 34 between write pole 22 and return poles 24 and 26. This induces a magnetic field across insulating material 34 between write pole 22 and return poles 24 and 26. By reversing the direction of currents I1 and I2 through coils 30 and 32, the polarity of the magnetic field, and thus of the data written to the magnetic medium, is reversed. Although coils 30 and 32 are depicted as being positioned at opposing sides of write pole 22, coils 30 and 32 can be positioned at other locations relative to write pole 22 as long as current in coils 30 and 32 can be driven in a coordinated fashion so that coils 30 and 32 either produce magnetic fields that add, or magnetic fields that subtract, at write pole 22.

Remnant magnetization is any magnetic field emanating from write pole 22 when no magnetic field is desired. For example, when recording head 10 is idle, or at steady state, magnetization perpendicular to the ABS is ideally at a minimum or non-existent. Sources of remnant magnetization can include stray fields, non-perfect magnetic poles, or any external sources causing a magnetic field in a direction parallel or perpendicular to the ABS. Sources of stray magnetic fields include the motors in the drives or even the disc drives themselves. These fields tend to pass through the write pole and are absorbed into the highly permeable underlayer of the magnetic medium, destroying previously written data. Remnant magnetization also includes Barkhausen noise caused by the existence of multiple domains in the pole/yoke, which can cause the generation of transient magnetic fields that may have a component perpendicular to the ABS.

FIG. 2 is a top view of magnetic recording head 10 according to the first embodiment of the present invention. In a preferred embodiment, first magnetizing coil 30 is located at a first side of writer portion 14 and second magnetizing coil 32 is located at a second, opposite side of writer portion 14. First end 36 of first magnetizing coil 30 and first end 38 of second magnetizing coil 32 are connected to first lead 40 and second lead 42, respectively, and are also operatively connected to write circuit 44 through leads 40 and 42. Write circuit 44 controls the magnitude and direction of currents I1 and I2 flowing through first magnetizing coil 30 and second magnetizing coil 32, respectively. Second end 46 of first magnetizing coil 30 and second end 48 of second magnetizing coil 32 are connected to each other by a common lead 50. Common lead 50 is grounded and maintains a common potential with respect to leads 40 and 42. The direction of currents I1 and I2 in magnetizing coils 30 and 32, respectively, can be independently controlled and reversed by changing the potential of leads 40 and 42 with respect to the potential of common lead 50. Currents I1 and I2 combine and either add or subtract from each other to create current I3. Common lead 50 does not otherwise affect the operation of magnetic recording head 10.

Figure 3A:
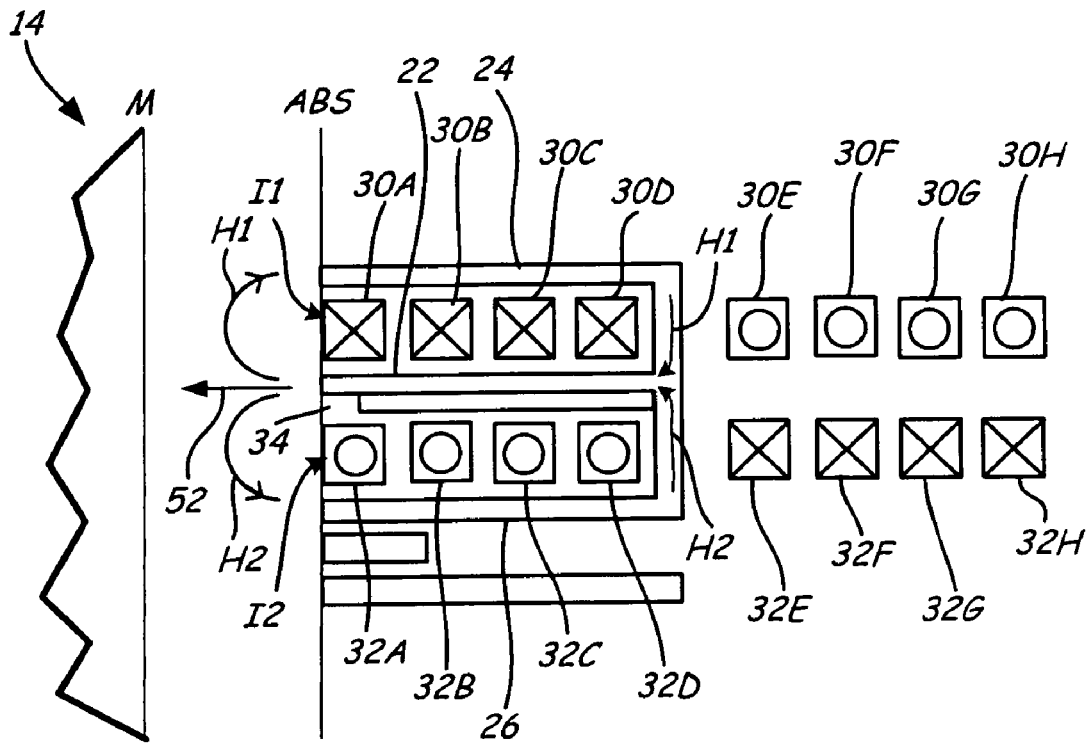
FIG. 3A is a side view of the magnetic recording head when the writer is writing in a first direction according to the first embodiment of the present invention.
Figure 3B:
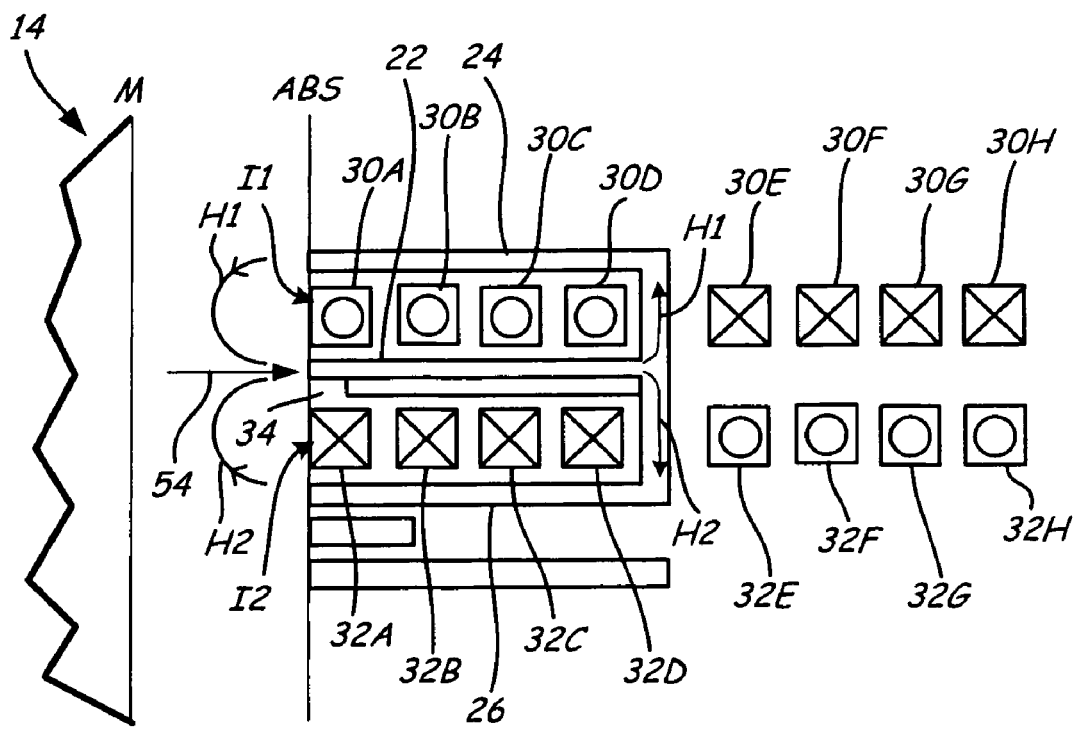
FIG. 3B is a side view of the magnetic recording head when the writer is writing in a second direction according to the first embodiment of the present invention.
Figure 3C:
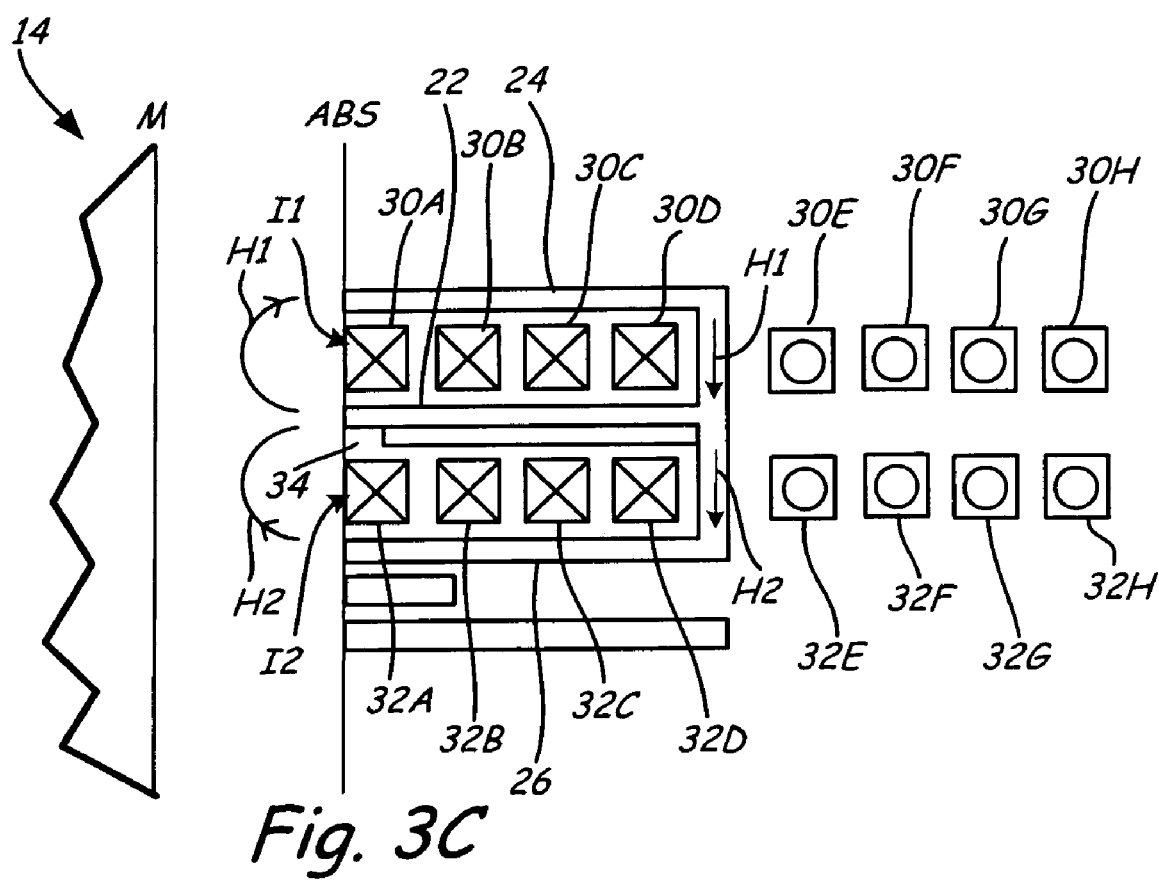
FIG. 3C is a side view of the magnetic recording head when the writer is idle according to the first embodiment of the present invention.

FIGS. 3A-3C are cross sections of magnetic recording head 10 shown in FIG. 2 during writing and non-writing (i.e. when magnetic recording head 10 is idle), respectively. Even when writer 14 is not writing, currents I1 and I2 are provided to magnetizing coils 30 and 32 such that the magnetic field perpendicular to the ABS at write pole 22 is substantially zero. Coil windings (shown in cross section as inner windings 30A-30D and 32A-32D and outer windings 30D-30H and 32D-32H) of magnetizing coils 30 and 32 are positioned such that magnetic field H1 and H2 generated by currents I1 and I2 passing through magnetizing coils 30 and 32, respectively, result in a net magnetic field perpendicular to the ABS at write pole 22 during writing. In FIG. 3A, the net magnetic field perpendicular to the ABS is in a direction away from write pole 22 (and toward magnetic medium M). In FIG. 3B, the net magnetic field perpendicular to the ABS is in a direction toward write pole 22 (and away from magnetic medium M).

As illustrated in FIG. 1, in one configuration of first coil windings 30A-30H, the coils may be wrapped in the following order: 30D to 30E to 30C to 30F to 30B to 30G to 30A to 30H. In one configuration of second coil windings 32A-H, the coils may be wrapped in the following order: 32D to 32E to 32C to 32F to 32B to 32G to 32A to 32H. Each of the individual coils 30A-30H and 32A-32H are separated from one another and from write pole 22 and return poles 24 and 26 by an insulating material 34.

When current I1 is passed through first magnetizing coil 30, first magnetizing coil 30 induces a magnetic field in write pole 22 and return pole 24 that generates magnetic field H1 at write pole 22. Similarly, current I2 through coil 32 induces a magnetic field in write pole 22 and return pole 26 that generates magnetic field H2 at write pole 22. Depending on the direction of current I2 passing through second magnetizing coil 32 in relation to the direction of current I1 passing through first magnetizing coil 30, writer 14 will either be writing (in a first or a second direction) or not writing. When writing, writer 14 produces magnetic field H1 and H2 that compliment each other to produce a magnetic field in either a first direction toward magnetic medium M or a second direction toward write pole 22. When the magnetic fields H1 and H2 compliment each other, the combined magnetic field of H1 and H2 writes information onto magnetic medium M. When writer 14 is not writing, magnetic fields H1 and H2 oppose each other in order to prevent erasing of data already written on the magnetic medium.

FIG. 3A shows the directions of currents I1 and I2 flowing through first magnetizing coil 30 and second magnetizing coil 32 and the resulting directions of magnetic fields H1 and H2 generated that cause writing in the first direction. In FIG. 3A and 3B, an "X" within a coil indicates current traveling into the paper, and an "O" within a coil indicates current traveling out of the paper. Thus, in FIG. 3A, current is passing into the paper in coils 30A-30D and 32E-32H, while current is passing out of the paper in coils 30E-30H and 32A-32D. Coils 30 and 32 are coordinated so that when currents I1 and I2 are passed through coils 30 and 32, magnetic fields H1 and H2 produced at write pole 22 are additive in the first direction perpendicular to the ABS to create net magnetic field 52.

In FIG. 3B, the directions of currents I1 and I2 are reversed from the directions shown in FIG. 3A. The result is magnetic fields H1 and H2 adding in the second direction perpendicular to the ABS to create net magnetic field 54.

FIG. 3C shows the directions of currents I1 and I2 flowing through first magnetizing coil 30 and second magnetizing coil 32 and the resulting directions of magnetic fields H1 and H2 generated when writer 14 is not writing (i.e. idle). The relative magnitudes of currents I1 and I2 are selected to compensate for any remnant magnetization to ensure that accidental writing or erasing does not occur on the magnetic media. In FIG. 3C, current is flowing into the paper in coils 30A-30D and 32A-32D, and current is flowing out of the paper in coils 30E-30H and 32E-32H. However, the same effect would result if the directions of current I1 and I2 are reversed from the directions shown in FIG. 3C such that current is flowing out of the paper in coils 30A-30D and 32A-32D, and current is flowing into the paper in coils 30E-30H and 32E-32H. When writer 14 is not writing, currents I1 and I2 are still passed through coils 30 and 32, respectively, but currents I1 and I2 are passed in directions so that magnetic fields H1 and H2 induced by coils 30 and 32 at the ABS are opposed to each other. This eliminates or substantially reduces any remnant magnetization at write pole 22. Magnetic fields H1 and H2 may be equal so that they cancel each other out, or magnetic fields H1 and H2 may be slightly unequal so that they cancel each other out and also cancel out any remnant magnetization that may be present. Magnetic fields H1 and H2 oppose each other at the ABS when writer 14 is not writing to ensure that there is minimal or no net magnetic field perpendicular to the ABS and that no data is written onto magnetic medium M.

In order to ensure that there is minimal or no net magnetic field perpendicular to the ABS during non-writing, the steady state magnetic field perpendicular to the ABS must be known so that the correct current for I1 and I2 can be applied. The steady state magnetic field perpendicular to the ABS is determined when the magnetic recording head 10 is not writing. Once the steady state magnetic field perpendicular to the ABS is known, currents I1 and I2 can be applied to magnetizing coils 30 and 32 so that the net magnetic field perpendicular to the ABS (produced by coils 30 and 32 as well as other sources) is zero or about zero.

Any remnant magnetization perpendicular to the ABS can be measured during steady state. If there is remnant magnetization, currents I1 and I2 in first and second magnetizing coils 30 and 32 can be adjusted until the net magnetic field perpendicular to the ABS is zero or about zero. When current I1 and I2 of magnetizing coils 30 and 32 are properly adjusted, there is no net magnetic field or minimal net magnetic field in the direction perpendicular to the ABS during steady state.

Additionally, current I1 and I2 passing through first magnetizing coil 30 and second magnetizing coil 32 continue to generate heat in write pole 22 even when writer 14 is not writing. In conventional magnetic recording heads, when the magnetic recording head is not performing a write process, the temperature of the magnetic recording head decreases and the recording head, composed of metal, contracts relative to the slider, because there is no current flowing through coils 30 and 32. When the magnetic recording head is writing, any current flowing through the write coils heats the recording head, causing the recording head to expand. In magnetic recording head 10 of the present invention, the steady generation of heat from the continuous flow of current I1 and I2 through first magnetizing coil 30 and second magnetizing coil 32 maintains magnetic recording head 10 at a relatively constant temperature so that any expansion or contraction in magnetic recording head 10 due to temperature changes is minimal. Also, because currents I1 and I2 are applied in each coil 30 and 32 even when magnetic recording head 10 is not writing, poles 22, 24, and 26 remain expanded and are thus positioned closer to magnetic medium M, increasing the accuracy of magnetic recording head 10.

Although the first embodiment of magnetic recording head 10 helps prevent remnant magnetization directed perpendicular to the ABS, Barkhausen noise is more difficult to control because it is random. Barkhausen noise cannot be canceled using only the features of the first embodiment of magnetic recording head 10 because the direction of the magnetic field component produced perpendicular to the ABS as a result of Barkhausen noise is unknown. One way to eliminate Barkhausen noise is to eliminate the existence of multiple domains in the pole tip. An external field can be used in a direction parallel to the ABS which will help stabilize the domain structures parallel to the ABS such that there is minimal or no net magnetization in a direction perpendicular to the ABS. The second embodiment of the magnetic recording head of the present invention addresses this issue.

Figure 4:
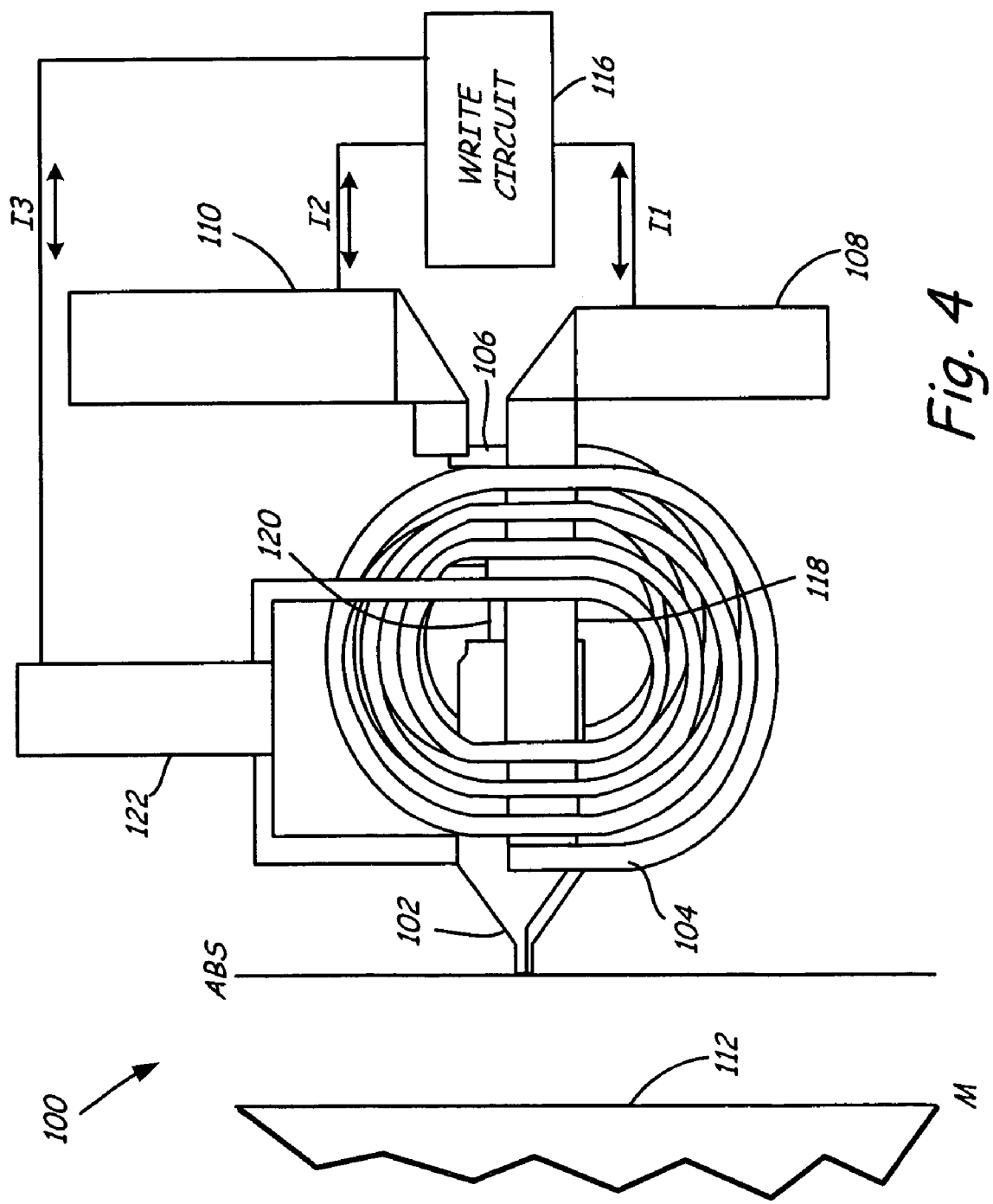
FIG. 4 is a top view showing write coils, stabilizers, and a write pole of the magnetic recording head according to a second embodiment of the present invention.

FIG. 4 is a top view of a second embodiment of magnetic recording head 100 of the present invention. Magnetic recording head 100 includes writer 102 having the capability to control remnant magnetization. As shown in FIG. 4, first magnetizing coil 104 is proximate to a first side of writer 102 and second magnetizing coil 106 is proximate to a second side of writer 102. However, coils 104 and 106 can be positioned at different locations relative to magnetic recording head 100 without departing from the scope of the invention, as will be apparent to those skilled in the art. First magnetizing coil 104 includes first stabilizer 118. Second magnetizing coil 106 includes second stabilizer 120. (See FIG. 7A) First lead 108 and second lead 110 are connected to first stabilizer 118 of first magnetizing coil 104 and second stabilizer 120 of second magnetizing coil 106, respectively. Leads 108 and 110 operatively connect first magnetizing coil 104 and second magnetizing coil 106 to write circuit 116, which controls currents I1 and I2 flowing through first magnetizing coil 104 and second magnetizing coil 106, respectively. Currents I1 and I2 combine and either add or subtract from each other to create current I3. Thus, current I3 is adjusted by adjusting currents I1 and I2. First stabilizer 118 and second stabilizer 120 operatively are a part of first magnetizing coil 104 and second magnetizing coil 106, respectively, and operatively connect first lead 108 and second lead 110 to common lead 122, respectively. Common lead 122 allows the directions of currents I1 and I2 in magnetizing coils 104 and 106, respectively, to be independently controlled. Common lead 122 is grounded and maintains a common potential with respect to first lead 108 and second lead 110. The direction of currents I1 and I2 in magnetizing coils 104 and 106 are reversed by changing the potential of leads 108 and 110 with respect to the potential of common lead 122. Common lead 122 does not otherwise affect the operation of magnetic recording head 100.

Figure 5:
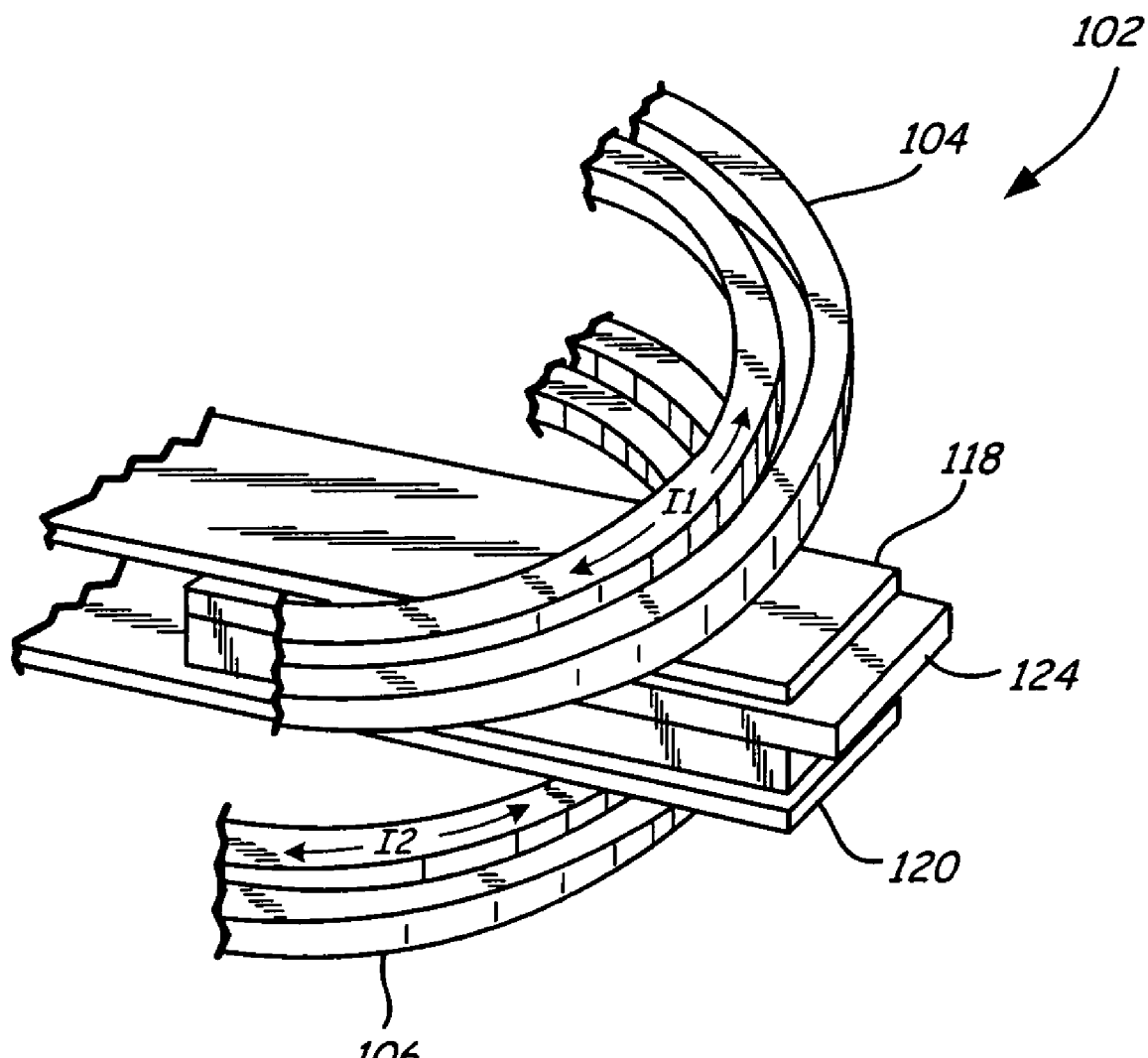
FIG. 5 is a perspective view showing a write pole tip region of the magnetic recording head according to the second embodiment of the present invention.

FIG. 5 shows a perspective view of writer 102 shown in FIG. 4. Write pole 124 is located between first stabilizer 118 and second stabilizer 120, and between first magnetizing coil 104 and second magnetizing coil 106. First stabilizer 118 is positioned at a first side of write pole 124 and is the most proximate portion of first magnetizing coil 104 to write pole 124. Second stabilizer 120 is positioned at a second, opposite side of write pole 124 and is the most proximate portion of second magnetizing coil 106 to write pole 124. Stabilizers 118 and 120 are positioned with respect to write pole 124 so that current I1 through first stabilizer 118 and current I2 through second stabilizer 120 induce magnetic fields in write pole 124 that are parallel to the ABS. During writing, these parallel magnetic fields are in opposite directions and oppose each other. During non-writing, the parallel magnetic fields compliment each other to stabilize domains in write pole 124. Stabilizers 118 and 120 are preferably made from conductive non-magnetic materials. Examples of conductive non-magnetic materials include copper, gold, chromium, or alloy, although other conductive non-magnetic materials may be used without departing from the intended scope of the invention, as will be evidence to those skilled in the art.

Figure 6:
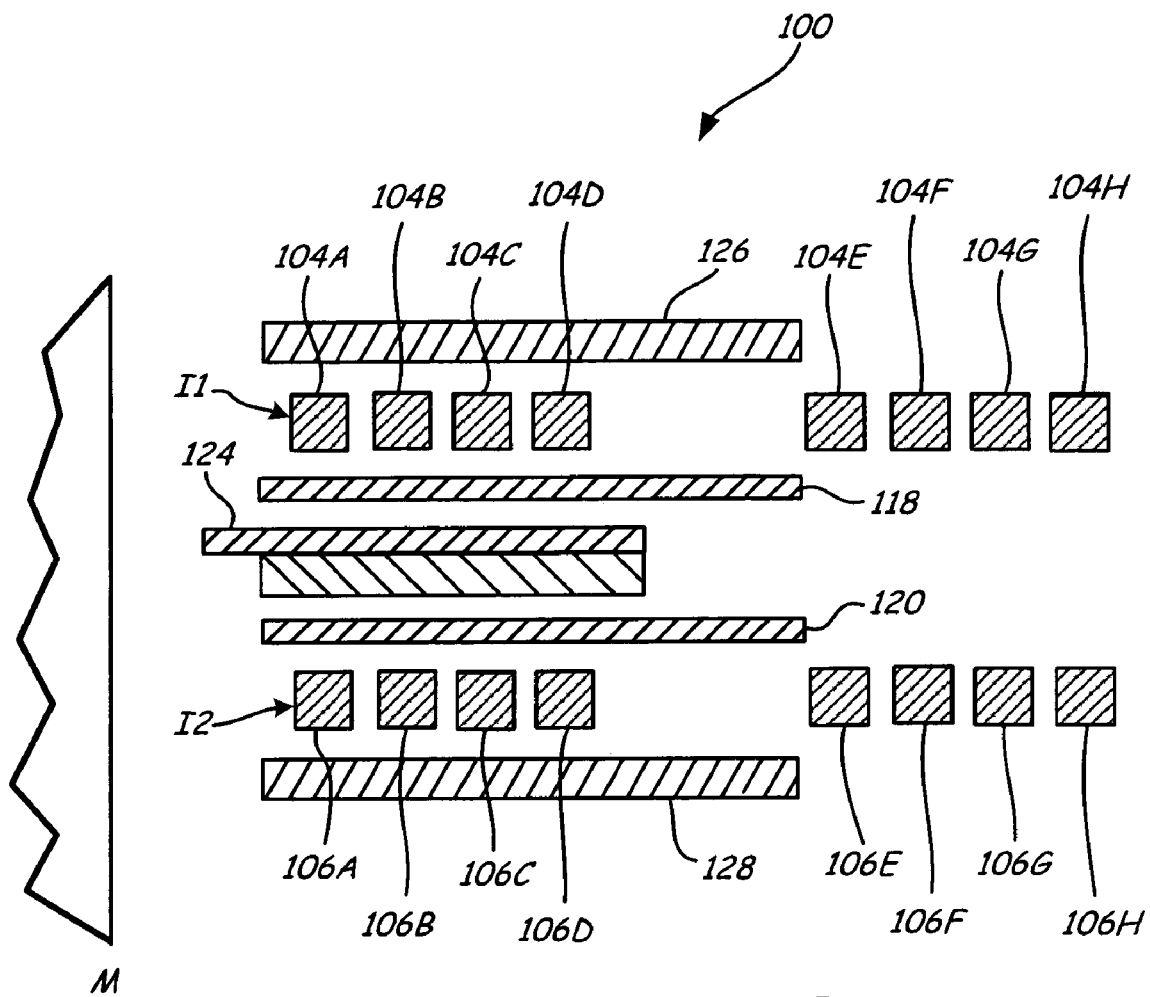
FIG. 6 is a side view of the magnetic recording head according to the second embodiment of the present invention.

FIG. 6 shows a cross-sectional view of magnetic recording head 100 shown in FIG. 4. Coil windings (shown as inner windings 104A-104D and 106A-106D and outer windings 104E-104H and 106E-106H) of magnetizing coils 104 and 106 are positioned such that the magnetic fields induced by magnetizing coils 104 and 106 by current I1 and I2 passing through magnetizing coils 104 and 106 compliment each other to result in a net magnetic field perpendicular to the ABS at write pole 124 during writing. In a preferred embodiment, first magnetizing coil 104 is positioned between first return pole 126 and write pole 124 and second magnetizing coil 106 is positioned between second return pole 128 and write pole 124.

In one configuration of first coil windings 104A-104H, the coils may be wrapped in the following order: 104D to 104E to 104C to 104F to 104B to 104G to 104A to 104H. In one configuration of second coil windings 106A-106H, the coils may be wrapped in the following order: 106D to 106E to 106C to 106F to 106B to 106G to 106A to 106H. Each of the individual coils 104A-104H and 106A-106H are separated from one another and from write pole 124 and stabilizers 118 and 120 by an insulating material. It should be noted that although not shown in FIG. 6, first coil 104 and first stabilizer 118, and second coil 106 and second stabilizer 120, are operatively connected to each other, as depicted in FIG. 4.

Figure 7A:
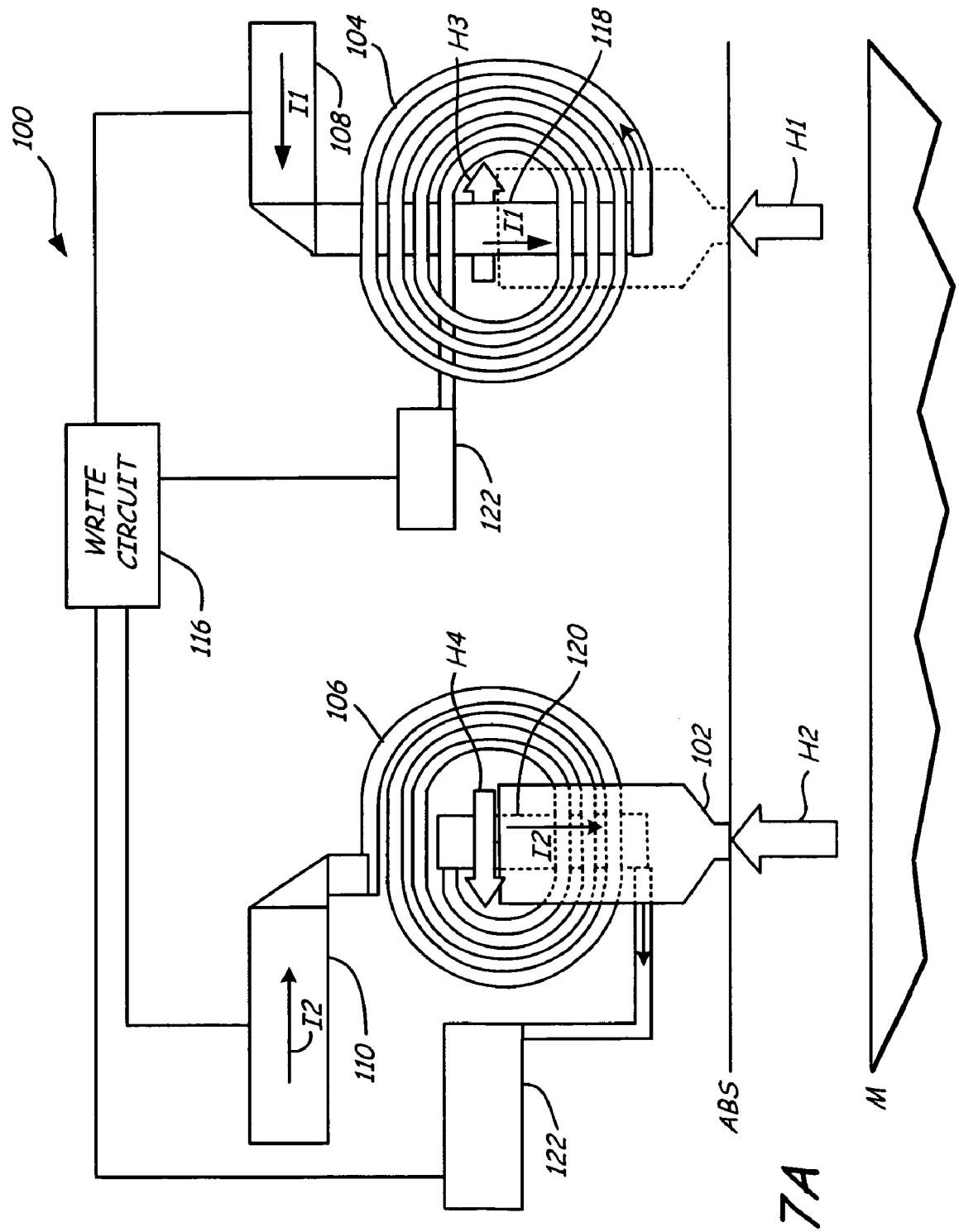
FIGS. 7A and 7B are diagrams illustrating the magnetic recording head writing in first and second directions, respectively, according to the second embodiment of the present invention.
Figure 7B:
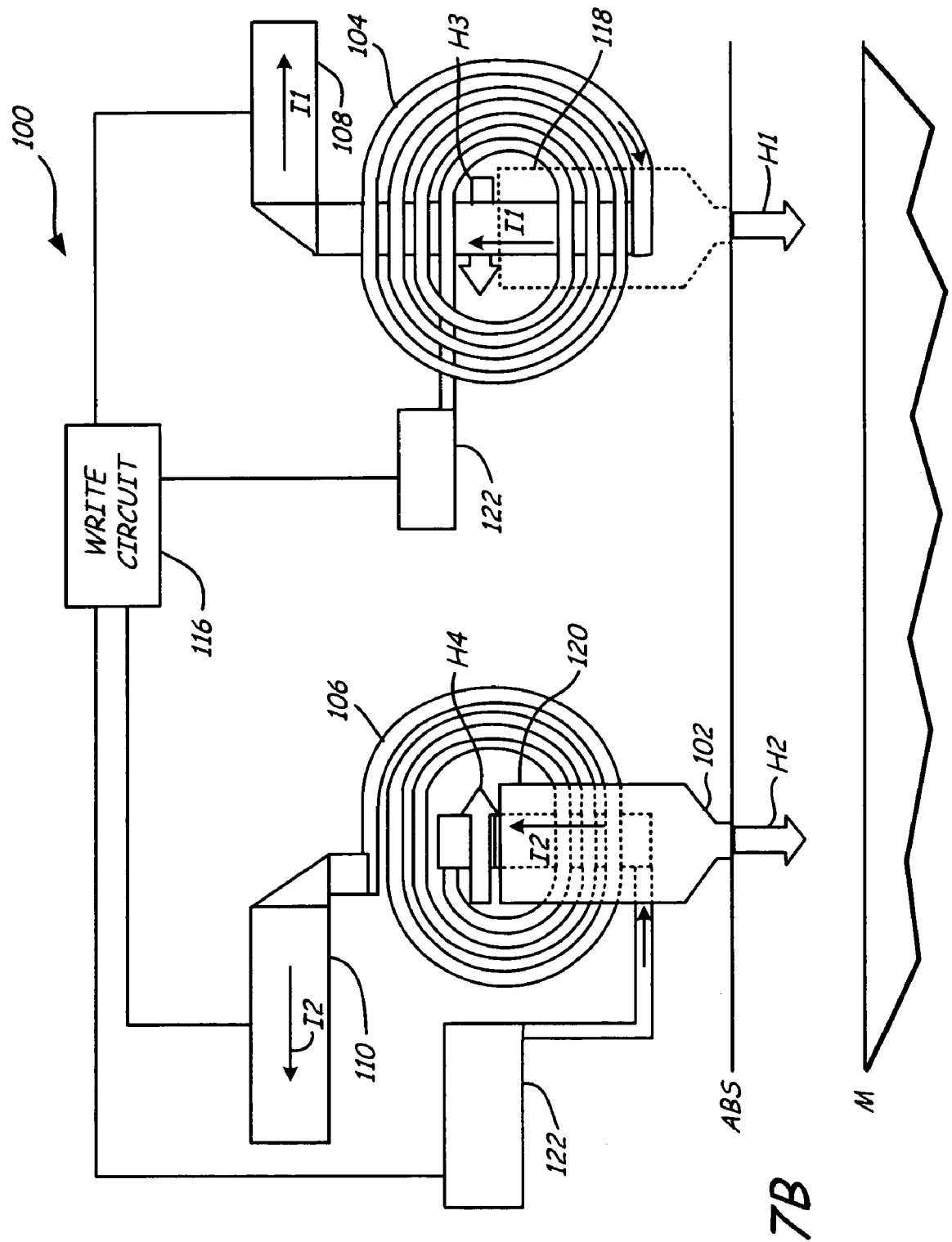
Figure 7C:
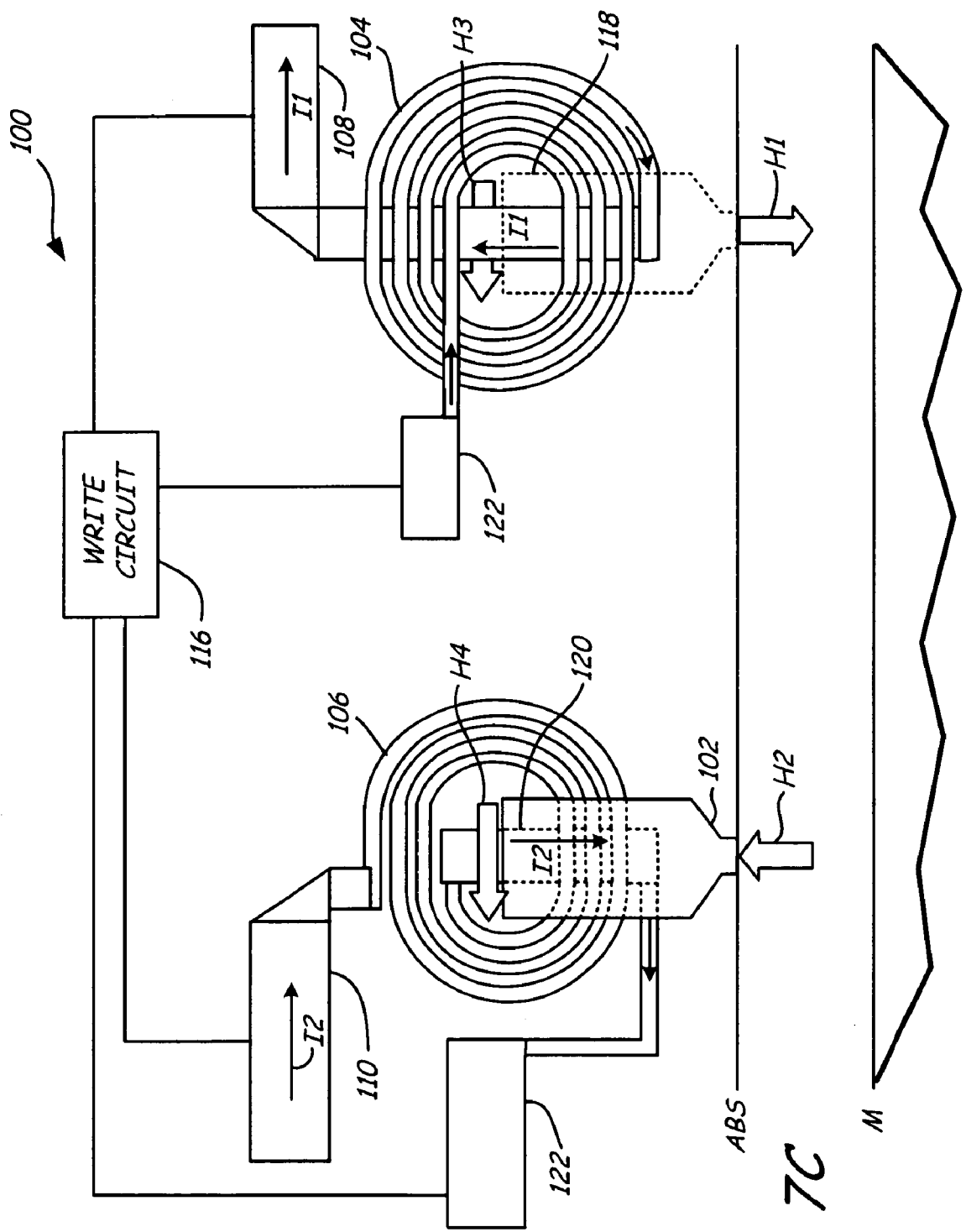
FIG. 7C is a diagram illustrating the magnetic recording head according to the second embodiment of the present invention when the writer is idle.

FIGS. 7A, 7B, and 7C are exploded views with a top view of writer 102 (shown in phantom), first magnetizing coil 104, and first stabilizer 118 on the right side and a top view of writer 102, second magnetizing coil 106, and second stabilizer 120 on the left side. FIGS. 7A, 7B, and 7C illustrate the directions of currents I1 and I2 provided by write circuit 116 passing through first lead 108 and first magnetizing coil 104 and second lead 110 and second magnetizing coil 106. FIGS. 7A, 7B, and 7C also illustrate the resulting directions of magnetic field H1 and H2 created by first magnetizing coil 104 and second magnetizing coil 106, respectively, and the resulting directions of magnetic field H3 and H4 created by first stabilizer 118 and second stabilizer 120, respectively.

As in the first embodiment of magnetic recording head 10, currents I1 and I2 passing through first magnetizing coil 104 and second magnetizing coil 106 produce magnetic fields H1 and H2 at write pole 124, respectively, in a direction perpendicular to the ABS. In the second embodiment of magnetic recording head 100, magnetizing coils 104 and 106 which include stabilizers 118 and 120, are arranged around write pole 124 such that as current I1 and I2 pass through first stabilizer 118 and second stabilizer 120, first stabilizer 118 and second stabilizer 120 create magnetic field H3 and H4 at write pole 124, respectively, in a direction parallel to the ABS. Depending on the direction of current I2 passing through second magnetizing coil 106 in relation to the direction of current I1 passing through first magnetizing coil 104, writer 102 will either be writing in a first or a second direction or not writing. When writing, writer 102 produces magnetic fields H1 and H2 that compliment each other either in a first direction toward magnetic medium M or a second direction toward write pole 124. The combined magnetic field H1 and H2 writes information onto magnetic medium M. When writer 102 is not writing, magnetic fields H1 and H2 oppose each other in order to prevent erasing of data written on the magnetic medium. Writer 102 also produces magnetic field H3 and H4. Magnetic fields H3 and H4 oppose each other when writer 102 is writing. When not writing, magnetic fields H3 and H4 compliment each other to stabilize the domains in write pole 124.

FIGS. 7A and 7B illustrate the directions of current I1 and I2 passing through first magnetizing coil 104 and second magnetizing coil 106 when writer 102 is writing. When current I1 is passed through first magnetizing coil 104, first magnetizing coil 104 induces a magnetic field in write pole 124 and return pole 126 that generates magnetic field H1 at write pole 124. Similarly, current I2 through second magnetizing coil 106 induces a magnetic field in write pole 124 and return pole 128 that generates magnetic field H2 at write pole 124. When current I1 is passed through first stabilizer 118 of first magnetizing coil 104, first stabilizer 118 generates magnetic field H3 at write pole 124. When current I2 is passed through second stabilizer 120 of second magnetizing coil 106, second stabilizer 120 generates magnetic field H4 at write pole 124. In FIG. 7A, the net magnetic field perpendicular to the ABS is in a direction away from write pole 124 (and toward magnetic medium M). In FIG. 7B, the net magnetic field perpendicular to the ABS is in a direction toward pole 124 (and away from magnetic medium M).

FIG. 7A shows the directions of current I1 and I2 flowing through first magnetizing coil 104 and second magnetizing coil 106 and the resulting directions of magnetic field H1 and H2 generated that cause writing in the first direction. During writing, current I2 in second magnetizing coil 106 is passed in a direction opposite the direction of current I1 in first magnetizing coil 104 and resulting magnetic field H2 is created in the same direction as magnetic field H1 of first magnetizing coil 104. Because magnetic fields H1 and H2 generated by coils 104 and 106, respectively, flow through write pole 124 in the same direction, the net magnetic field is driven perpendicular to the ABS.

In FIG. 7B, the directions of current I1 and I2 are reversed from the directions shown in FIG. 7A. The result is magnetic fields H1 and H2 complimenting each other in the second direction perpendicular to the ABS.

Because there are two coils 104 and 106 and two stabilizer sections 118 and 120 of coils 104 and 106, respectively, it is also possible to produce a magnetic field component parallel to the ABS in either one of two directions. During writing, currents I1 and I2 pass through stabilizers 118 and 120 in directions such that magnetic fields H3 and H4 generated by first stabilizer 118 and second stabilizer 120, respectively, are directed parallel to the ABS within write pole 124 and are opposed to each other. When writer 102 is writing, magnetic fields H3 and H4 parallel to the ABS oppose each other and cancel each other out so that the net magnetic field in write pole 124 is only in a direction perpendicular to the ABS.

FIG. 7C illustrates the directions of current I1 and I2 in first magnetizing coil 104 and second magnetizing coil 106, respectively, when writer 102 is not writing. FIG. 7C also illustrates the resulting directions of magnetic fields H1 and H2 created by first magnetizing coil 104 and second magnetizing coil 106, respectively, and the resulting directions of magnetic fields H3 and H4 created by first stabilizer 118 and second stabilizer 120, respectively. When writer 102 is not writing, current I2 is passed through second magnetizing coil 106 in the same direction as current I1 passing through first magnetizing coil 104. Resulting magnetic field H2 is created in the opposite direction of magnetic field H1 of first magnetizing coil 104. Because magnetic fields H1 and H2 generated by coils 104 and 106, respectively, flow through write pole 124 in opposite directions, magnetic fields H1 and H2 oppose each other. Magnetic fields H1 and H2 can be equal so that they cancel each other out, or they may be slightly unequal so that they cancel each other out and also cancel out any remnant magnetization present. Magnetic fields H1 and H2 oppose each other at the ABS when writer 102 is not writing to ensure that there is minimal or no net magnetic field perpendicular to the ABS and that no data is written onto the magnetic medium.

In order to ensure that there is minimal or no net magnetic field perpendicular to the ABS when writer 102 is not writing, the steady state magnetic field perpendicular to the ABS must be known so that the correct current difference can be applied. Once the steady state magnetic field perpendicular to the ABS is known, currents I1 and I2 can be applied to magnetizing coils 104 and 106 so that the net magnetic field perpendicular to the ABS (produced by coils 104 and 106 as well as other sources) is zero.

Any remnant magnetization perpendicular to the ABS can be measured during steady state. If there is remnant magnetization, currents I1 and I2 in first and second magnetizing coils 104 and 106 can be adjusted until the net magnetic field perpendicular to the ABS is zero. When current I1 and I2 of magnetizing coils 104 and 106 are properly adjusted, there is no net magnetic field or minimal net magnetic field in the direction perpendicular to the ABS during steady state.

At the same time that current I2 through first magnetizing coil 104 and current I2 through second magnetizing coil 106 induce magnetic fields H1 and H2 perpendicular to the ABS that oppose each other, currents I1 and I2 through first stabilizer 118 and second stabilizer 120 induce magnetic fields H3 and H4, respectively, parallel to the ABS that compliment each other. Because magnetic fields H3 and H4 are complimentary, and because the magnetization direction of the magnetic material of write pole 124 when writer 102 is not writing is parallel to the ABS, additive magnetic fields H3 and H4 produced by stabilizers 118 and 120 ensure that there is a single domain in write pole 124 and that the domain has a magnetization direction parallel to the ABS. The resulting magnetic field parallel to the ABS saturates the pole tip and reduces permeability in the perpendicular direction so that stray fields do not concentrate at the pole tip.

As with the first embodiment of magnetic recording head 10, when writer 102 of magnetic recording head 100 is not writing, currents I1 and I2 continue to flow through at least one of coils 104 and 106, maintaining a steady supply of heat through writer 102. The continued heating thus holds magnetic recording head 100 at a constant temperature, minimizing any contraction or expansion of metal in magnetic recording head 100. Also, as with the first embodiment of magnetic recording head 10, because currents I1 and I2 are continually applied in each coil 104 and 106 without producing a net magnetic field in a direction perpendicular to the ABS (no writing), write pole 124 remains expanded and is thus positioned closer to magnetic medium M, increasing the accuracy of magnetic recording head 100.

The magnetic recording head of the present invention controls remnant magnetization. During writing, the magnetic recording head writes data onto a magnetic medium. After writing, the magnetic recording head is at steady state. When the magnetic recording head is not writing, any remnant magnetization must be controlled to ensure that no accidental writing or erasing occurs on the magnetic medium. The magnetic recording head comprises two magnetizing coils positioned to induce magnetic fields in a write pole. Depending on the direction of the current in the second magnetizing coil relative to the direction of the current in the first magnetizing coil, the magnetic recording head will either be writing or not writing.

In both the first and second embodiments of the present invention, during non-writing, a net zero magnetic field at the write pole results from opposing directions of magnetic fields generated by the magnetizing coils canceling each other and any remnant field. The opposing magnetic fields help prevent remnant magnetization and are applied perpendicular to the ABS. Additionally, the magnetic recording head is maintained at a relatively constant temperature by continually providing current through the magnetizing coils whether the magnetic recording head is writing or not writing.

In the second embodiment of the present invention, when the magnetic writer is idle, current I1 and I2 through stabilizers create additive magnetic fields parallel to the ABS. This stabilizes domains in the write pole to help prevent erasure caused by noise.

Although the present invention has been described with reference to preferred embodiments, workers skilled in the art will recognize that changes may be made in form and detail without departing from the spirit and scope of the invention.

The invention claimed is:

1. A magnetic writer comprising:
  a write circuit;
  a write pole;
  a first write coil for inducing a first magnetic field in the write pole by a first current provided by the write circuit; and
  a second write coil for inducing a second magnetic field in the write pole by a second current provided by the write circuit;
  wherein the write circuit controls direction of the first current and the second current so that, during writing, the first magnetic field and the second magnetic field have components perpendicular to an air bearing surface that are in the same direction, and when not writing, the first magnetic field and second magnetic field have components perpendicular to the air bearing surface in opposite directions.

2. The magnetic writer of claim 1, wherein the first and second write coils include portions positioned with respect to the write pole that produce magnetic field components parallel to the air bearing surface, and wherein the write circuit controls current flow through the first and second write coils so that, when writing, the magnetic field components parallel to the air bearing surface are in opposite directions, and when not writing, the magnetic field components parallel to the air bearing surface are in the same direction.

3. The magnetic writer of claim 2, wherein the portions of the first and second write coils positioned with respect to the write pole that produce magnetic field components parallel to the air bearing surface are made of a conductive non-magnetic material.

4. The magnetic writer of claim 1, wherein the first write coil and the second write coil are positioned at opposite sides of the write pole.

5. The magnetic writer of claim 1, and further comprising a common lead for permitting individual control of the direction of the currents passing through the first and second write coils.

6. The magnetic writer of claim 1, wherein the write circuit continually provides current through the first and second write coils so that the magnetic writer is maintained at a desired constant temperature.

7. A magnetic writer for writing magnetic information, the magnetic writer comprising:
  a write pole;
  a first coil for inducing a first magnetic field in the write pole in response to a first current;
  a second coil for inducing a second magnetic field in the write pole in response to a second current;
  a first stabilizer for inducing a third magnetic field in the write pole in response to the first current; and
  a second stabilizer for inducing a fourth magnetic field in the write pole in response to the second current,
  wherein during writing, the first magnetic field and the second magnetic field have components perpendicular to the air bearing surface that are in the same direction and the third magnetic field and fourth magnetic field have components parallel to the air bearing surface in opposite directions, and when not writing, the first magnetic field and second magnetic field have components perpendicular to the air bearing surface in opposite directions and the third magnetic field and fourth magnetic field have components parallel to the air bearing surface that are in the same direction.

8. The magnetic writer of claim 7, wherein the first and second stabilizers are made of a conductive non-magnetic material.

9. The magnetic writer of claim 7, wherein the first coil and the first stabilizer are positioned at a first side of the write pole and the second coil and the second stabilizer are positioned at a second side opposite the first side of the write pole.

10. The magnetic writer of claim 9, wherein the first stabilizer is positioned between the first coil and the write pole and the second stabilizer is positioned between the second coil and the write pole.

11. The magnetic writer of claim 7 and further comprising a common lead connecting the first and second coils to each other and enabling individual control of the direction of the first current in the first coil and the second current in the second coil.

12. A method of reducing remnant magnetization emanating from a magnetic writer, the method comprising:
  passing a first current provided by a write circuit through a first write coil to induce a first magnetic field in a write pole;
  passing a second current provided by the write circuit through a second write coil to induce a second magnetic field in the write pole, the second magnetic field having components perpendicular to an air bearing surface in the same direction as the first magnetic field when the magnetic writer is writing and in a direction opposite the first magnetic field when the magnetic writer is not writing;
  measuring remnant magnetization directed at the air bearing surface of the write pole during a non-writing period; and
  adjusting the first current and the second current based on the measured remnant magnetization to reduce remnant magnetization directed at the air bearing surface when the magnetic writer is not writing.

13. The method of claim 12 and further comprising passing the first current through a first stabilizer to induce a third magnetic field and passing the second current through a second stabilizer to induce a fourth magnetic field.

14. The method of claim 13, wherein the third and fourth magnetic fields having components parallel to the air bearing surface.

15. The method of claim 14, wherein the components of the third and fourth magnetic fields are parallel to the air bearing surface in the same direction.

16. The method of claim 12, and further comprising heating the magnetic writer during a non-writing period.

17. A method of operating a writer having a write pole, a write circuit, a first coil, and a second coil, the method comprising:
  writing data on a medium by passing a first current provided by the write circuit through the first coil to induce a first magnetic field in the write pole and passing a second current provided by the write circuit through the second coil to induce a second magnetic field in the write pole, the first and second magnetic fields having components perpendicular to an air bearing surface that are in the same direction; and preventing unwanted writing or erasure of data on the medium by passing the first current provided by the write circuit through the first coil to induce the first magnetic field in the write pole and passing the second current provided by the write circuit through the second coil to induce the second magnetic field in the write pole, the first and second magnetic fields having components perpendicular to the air bearing surface in opposite directions.

18. The method of claim 17 and further comprising passing the first current through a first stabilizer to induce a third magnetic field and passing the second current through a second stabilizer to induce a fourth magnetic field, the third and fourth magnetic fields having components parallel to the air bearing surface that are in opposite directions when writing data and in the same direction when preventing unwanted writing or erasure of data.

19. The method of claim 17, and further comprising maintaining the writer at a desired constant temperature.

* * * * *

UNITED STATES PATENT AND TRADEMARK OFFICE
CERTIFICATE OF CORRECTION

PATENT NO. : 7,440,213 B2
APPLICATION NO. : 11/054456
DATED : October 21, 2008
INVENTOR(S) : Nural Amin et al.

It is certified that error appears in the above-identified patent and that said Letters Patent is hereby corrected as shown below:

In the Specification:
Column 4, Line 1, delete "30D to 30B", insert --30D to 30E--

Signed and Sealed this

Fourteenth Day of September, 2010

David J. Kappos
*Director of the United States Patent and Trademark Office*